(12) United States Patent
Nordbryhn

(10) Patent No.: US 8,096,397 B2
(45) Date of Patent: Jan. 17, 2012

(54) METHOD AND SYSTEM FOR HANDLING EMPTY PACKAGING

(75) Inventor: Andreas Nordbryhn, Oslo (NO)

(73) Assignee: Tomra Systems ASA, Asker (NO)

( * ) Notice: Subject to any disclaimer, the term of this patent is extended or adjusted under 35 U.S.C. 154(b) by 662 days.

(21) Appl. No.: 11/570,991

(22) PCT Filed: Jul. 5, 2005

(86) PCT No.: PCT/NO2005/000254
§ 371 (c)(1),
(2), (4) Date: May 22, 2007

(87) PCT Pub. No.: WO2006/004431
PCT Pub. Date: Jan. 12, 2006

(65) Prior Publication Data
US 2008/0283356 A1    Nov. 20, 2008

(30) Foreign Application Priority Data

Jul. 5, 2004 (NO) .................................. 20042828

(51) Int. Cl.
*G07F 7/00* (2006.01)
*G07F 7/06* (2006.01)
*G06Q 20/00* (2006.01)

(52) U.S. Cl. ....................................... 194/205; 705/308
(58) Field of Classification Search .................. 194/209, 194/205, 208; 705/7.35, 308
See application file for complete search history.

(56) References Cited

U.S. PATENT DOCUMENTS

| | | | |
|---|---|---|---|
| 4,579,216 A * | 4/1986 | DeWoolfson et al. | 194/212 |
| 5,226,519 A * | 7/1993 | DeWoolfson | 194/209 |
| 5,346,048 A | 9/1994 | Wilhelm | |
| 5,435,445 A | 7/1995 | Dellinger, Jr. | |
| 5,630,493 A | 5/1997 | DeWoolfson | |
| 2006/0242056 A1 * | 10/2006 | Walker et al. | 705/37 |

FOREIGN PATENT DOCUMENTS

| WO | WO 91/10216 | 7/1991 |
|---|---|---|
| WO | WO 2004/032071 A1 | 4/2004 |

* cited by examiner

*Primary Examiner* — Mark Beauchaine
(74) *Attorney, Agent, or Firm* — Rodman & Rodman

(57) ABSTRACT

A method and a system for determining the remuneration for the return of identifiable empty packaging to a receiving point, wherein the empty packaging (7; 8) is identified with respect to at least one selected characteristic thereof, for example, dimension, type of packaging, type of material, recyclability, and deposit value, if any. The remuneration for individual types of empty packaging is related to at least two of a plurality of legal entities (10-15) which, for the return of empty packaging, are remuneration-providing and connectable to a remuneration coordinator (9) in communication with the receiving point in the form of a reverse vending machine (1), and to the remuneration level of the connected legal entities that is applicable at any given time for a particular type or particular types of empty packaging.

11 Claims, 1 Drawing Sheet

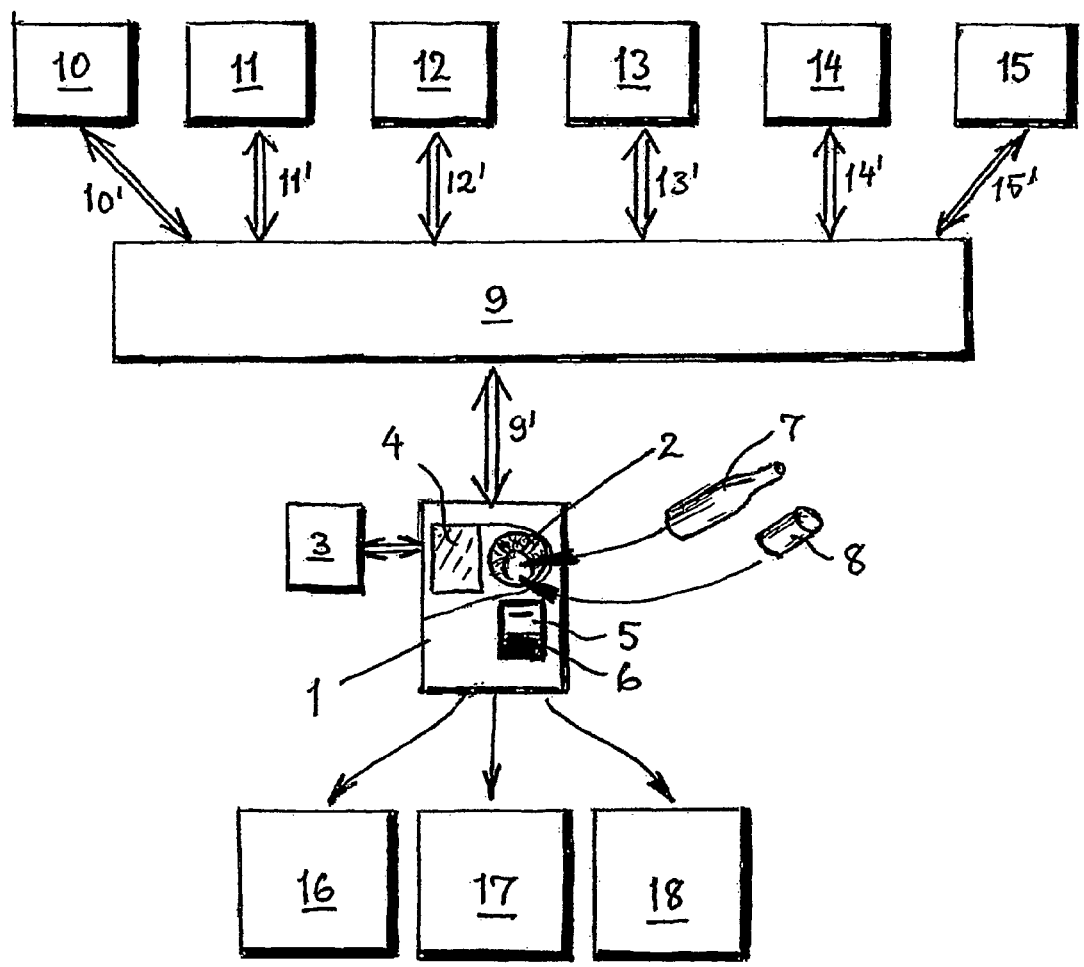

METHOD AND SYSTEM FOR HANDLING EMPTY PACKAGING

The present invention relates to a method and a system for handling empty packaging, and more specifically it relates to a method and a system for determining the remuneration for the return of identifiable empty packaging to a receiving point, wherein the empty packaging is identified with respect to at least one selected characteristic thereof, for example, dimension, type of packaging, type of material, recyclability, and deposit value, if any.

Today there is a wide variety of return systems, in particular those utilising reverse vending machines, in which a sum related to the returned empty packaging is refunded, the sum as a rule being the same as the amount of deposit the customer paid when purchasing the product with the packaging.

However, it is a constantly recurring problem that empty packaging without any associated prepaid deposit value of this kind is dumped in the environment or ends up in the refuse collection and contributes to the ever-increasing degree of so-called non-source separated refuse.

Both central and local authorities, and suppliers of goods with such, normally non-biodegradable, empty packaging, and the public in general is fully aware of this constantly growing litter problem, which current return systems do not address.

As an illustration of the prior art, reference is made to U.S. Pat. No. 5,346,048, which is based on the idea that the playing urge of people can be much more successfully motivated for the collection of articles in order to protect the environment. The document teaches an integral gaming machine which has means for determining randomly whether to award a prize, and which has a visual output means positioned on the front of the apparatus and coupled to the gaming device, such that activation of the gaming device also activates the visual means, and also a prize dispenser coupled to the gaming machine, whereby a prize is dispensed in response to a decision by a determining means. The prize is in no way directly linked to the number of empties returned, but rather it is linked to the randomness that will always be present in a gaming machine program. The value of the returned empties inserted allows the user to play on the gaming machine for the amount the returned empties represent, and the person playing ought to be fully aware that the possibility of losing his stake will probably be greater than winning it back, or for that matter getting more than his stake back. Thus, a customer who delivers his returnable empties may have the experience of not receiving any remuneration whatsoever in the form of a prize when gambling on the machine for the value the returned empties represent, whereas the next person to return a few articles of the same nominal value per article as the articles delivered by the previous user receives payment of a disproportionately large prize.

In U.S. Pat. No. 5,630,493 it is stated that to combat litter and increase the amount of material that is recycled, several states in the USA have enacted deposit laws that require the use of containers having an added deposit cost that is paid at the time of purchase. When the customer purchases a product, the deposit is added to the ordinary price, as is usual when purchasing, for example, beverages such as beer and soft drinks in Norwegian grocery stores. After the user has consumed the content of the product, he or she can obtain a refund of the deposit by returning the empty container, so that it can perhaps be recycled or reused. The amount of the deposit may be adjusted to create an incentive for returning the empty packaging, the incentive seeming greater than the inconvenience of returning the container for a refund of the deposit. In the states of the USA in question, retailers will collect used containers and sell them to distributors or others who pay for the scrap value of the containers plus an amount to cover the retailers' costs. In other words, the retailer gets something back for handling this return of empty packaging. According to that described in the said US patent, the only thing the customer gets back is the deposit he actually paid when he purchased the product.

The basis of the present invention is to be able to solve the problems associated with the fact that considerable quantities of materials of, for example, plastic, glass or metal are not recycled by being melted down, or cleaned for direct reuse, but go either directly to a waste disposal site or to general refuse incineration. The object of the present invention is therefore to provide a method and a system of the type mentioned above which by means of a new type of established return system for, inter alia, no-deposit empty packaging aims to be able at least to reduce the social problems that waste management involves. The object of the invention is therefore at least to create an incentive for consumers who see the possibility of being able to return also empty packaging that is no-deposit packaging, but which nonetheless is the subject of a certain remuneration.

Furthermore, it is also the object of the invention to create an incentive, in collaboration with the consumer, for legal entities such as central or local authorities, suppliers of goods that have been contained within the empty packaging, packaging manufacturers, suppliers of raw materials, companies and institutions that recycle empty packaging and others who may have special interests in aspects of the return of such empty packaging, so that the controlled return of empty packaging can increase and help reduce the litter problem, and also so that collaboration between two or more such legal entities can be established in order to bring about such return of the empty packaging. Although each individual legal entity alone cannot pay a sufficient reward to motivate the consumer to return his empty packaging, the total reward when several legal entities contribute according to his interest in the return taking place, will be sufficiently motivating for the consumer.

According to the invention, the method mentioned above is characterised by relating the remuneration for individual types of empty packaging to at least two legal entities which, for the return of empty packaging, are remuneration-providing and connectable to a remuneration coordinator in communication with the receiving point, and to the is remuneration level of the connected legal entities that is applicable at any given time for a particular type or particular types of empty packaging.

According to the invention, the system mentioned above is characterised by:
- a reverse vending machine that forms the receiving point for receiving the empty packaging;
- a remuneration coordinator connected to the reverse vending machine;
- at least two, for the return of empty packaging, remuneration-providing legal entities connected to the remuneration coordinator in communication with the reverse vending machine that forms the receiving point;
- that each of the legal entities is selectively, for example, in time-related manner, connectable to the remuneration coordinator; and
- that the remuneration coordinator is adapted to give a remuneration via the reverse vending machine as a function of the individual remuneration level of the connected legal entities that is applicable at any given time.

Additional embodiments of the method and the system will also be apparent from the attached, respective subsidiary claims 2-4 and 6-7, and from the following description with reference to the attached drawing figure.

The figure shows a reverse vending machine 1 with an insertion opening 2 that forms the receiving point for receiving empty packaging such as empty bottles 7 of glass or plastic and beverage cans 8 of metal. The reverse vending machine will have at least one device 3 for recognition of characteristics of the empty packaging, for example, its fixed deposit value, if any, its material type or kind, the value of its material based on the identity or weight of the empty packaging, and its recyclability. The reverse vending machine may, for example, be equipped with a display 4 of a known per se type so as to be capable of guiding the user of the reverse vending machine. Furthermore, the machine may be equipped with a device 5 for issuing a voucher or receipt for the calculated remuneration value, including a possible, refunded prepaid deposit, or may optionally have a device 6 for direct payment in cash of an amount corresponding to the return value. It is also conceivable that the remuneration could take place, for example, in the form of loyalty points or bonus points that are part of an activity program, other non-monetary inducements, or inducements which cannot be exchanged directly for money, for example, cinema or theatre tickets, tariff units or ringing time for fixed-line telephones or mobile telephones, discount coupons, special offers on certain products or services or the like.

Advantageously, the reverse vending machine will be operatively connected to collection points 16, 17 and 18 for returned empty packaging that has been examined by the reverse vending machine, the point 16, for example, representing a collection point for empty packaging that can be cleaned for immediate reuse, the point 17, for example, representing empty packaging that is not suitable for reuse or recycling by being melted down, and the point 18, for example, representing empty packaging whose material is intended for recycling by, for example, being melted down. Such recycling of the material does not necessarily need to result in a packaging product.

The reverse vending machine is connected via a signal connection 9' to a remuneration coordinator 9, and connected to the remuneration coordinator 9 via signal connections 10', 11', 12', 13', 14', 15' is at least one, for the return of empty packaging, remuneration-paying or remuneration-providing legal entity 10, 11, 12, 13, 14, 15. These one or more legal entities 10-15 may, for example, be public or private institutions, firms, production or sales companies, marketing or market analysis companies, shopping malls, etc.

Basically, the invention is concerned with relating the remuneration for individual types of empty packaging in a time-variable manner to at least one of the legal entities 10-15 which, for the return of empty packaging, is remuneration-paying or remuneration-providing and which is connectable to the remuneration coordinator 9 in communication with the receiving point in the form of the reverse vending machine 1, and to the remuneration level of the connected legal entity or entities that is applicable at any given time for a particular type or particular types of empty packaging, for example, bottles or cans 7, 8.

One or more of the legal entities 10-15 may be connected to the coordinator 9 at the same time. The remuneration for returned empty packaging is thus paid or given from the remuneration coordinator 9 via the reverse vending machine 1. The legal entities 10-15, which may of course vary in number, will be determining for how the remuneration coordinator 9 coordinates the remuneration.

Each of the legal entities 10-15 may, via the coordinator 9 and the reverse vending machine 1, base the remuneration for returned empty packaging and the individual articles of empty packaging, on, for example, one or more of the following parameters;

need for the return of at least one particular type of said empty packaging;

market survey of the return of at least one particular type of said empty packaging;

time-related return of empty packaging;

number of types of empty packaging returned per time unit;

fixed deposit value of the empty packaging;

type of material of the empty packaging;

value of the material of the empty packaging;

recyclability of the empty packaging;

type and/or location of the receiving point;

kind of empty packaging; and technical properties of the empty packaging.

It is also worth noting that one or more of the legal entities 10-15 may in a selective manner, for example, a time-related manner, be connectable to the remuneration coordinator 9. In this connection it should be understood that it may either be the remuneration coordinator 9 that takes the initiative to become connected to one or more of the legal entities 10-15, or only some or all of the legal entities 10-15 may take the initiative to become connected to the remuneration coordinator 9, or connection can take place in both ways in a preferred combination.

As indicated above, it is an important aspect of the invention that as many as possible of the legal entities, as for instance the entities 10-15, join forces in an empty packaging return system of this kind. Although initially it is a desire or an object that at least two legal entities should be connected to the remuneration coordinator 9 at any given time, it is of course possible that at times it is just one legal entity of the entities 10-15 that is active in relation to the coordinator 9. It is also conceivable that the remuneration coordinator 9 is adapted to provide a remuneration via the reverse vending machine 1 as a variable function of the individual remuneration level of the connected legal entity or entities that is applicable at any given time, or that it can itself choose which of the legal entities 10-15 it will use to provide the remuneration.

The remuneration coordinator 9 could be adapted to give a remuneration as a variable function of at least one of the following, additional parameters related to one or more of said legal entities 10-15:

the number of legal entities connected to the remuneration coordinator;

the type of legal entity or entities connected to the remuneration coordinator;

the individual remuneration level of the legal entity or entities;

the individual wholly or partly time-related remuneration or remuneration level of the legal entity or entities;

the individual wholly or partly time-limited remuneration or remuneration level of the legal entity or entities;

the total remuneration level for a particular type or particular types of empty packaging of two or more legal entities;

the total wholly or partly time-related remuneration level for a particular type or particular types of empty packaging of two or more legal entities;

the total wholly or partly time-limited remuneration level for a particular type or particular types of empty packaging of two or more legal entities;

public, private, socially beneficial or business interest that said at least one legal entity has for the return of empty packaging;
the individual connection time of each legal entity to the remuneration coordinator;
interactivity between legal entities; and
type of remuneration.

It will be understood that the return of empty packaging on which there is a prepaid deposit and where the remuneration comes in addition to the refund of the paid deposit, and the return of empty packaging without any prepaid deposit value will have a "surprise factor" or the character of a "stock exchange", as the availability at any given time of the said legal entities 10-15 at the coordinator 9 and their offer of a remuneration for different types empty packaging received will, via the coordinator 9, be determining for the "stock value" of the individual empty packaging when it is returned. As such, the coordinator 9 will, in effect, simulate a kind of stock exchange, the legal entities 10-15 will simulate a form of "share purchasers", and the reverse vending machine 1 will simulate a kind of "stockbroker". Another analogy is to regard the legal entities 10-15 as scrap dealers and the consumers as scrap collectors who receive a remuneration. Yet another analogy is to look upon the legal entities 10-15 and the consumers as a large group of volunteers who have a common task with respect to the return of empty packaging.

The invention claimed is:

1. A method for determining a remuneration to a consumer for an identifiable empty packaging returned by the consumer to a reverse vending machine, which method comprises:
    the reverse vending machine identifying the empty packaging with respect to at least one chosen characteristic thereof;
    a remuneration coordinator in communication with the reverse vending machine connecting to at least two legal entities which each provides an individual remuneration level for the returned empty packaging;
    the remuneration coordinator determining the remuneration for the empty packaging as the total of the individual remuneration levels that are applicable at any given time; and
    paying or giving the determined remuneration to the consumer from the remuneration coordinator via the reverse vending machine for the returned empty packaging.

2. A method as defined in claim 1, wherein giving the determined remuneration includes:
    issuing a voucher or receipt for the determined remuneration.

3. A method as defined in claim 1, wherein the remuneration is variable.

4. A method as defined in claim 1, wherein the returned empty packaging is a non-deposit packaging.

5. A method as defined in claim 1, wherein the remuneration for said returned empty packaging is in addition determined as a function of at least one parameter in the following groups of parameters:
    fixed deposit value of the empty packaging;
    type of material of the empty packaging;
    value of the material of the empty packaging;
    recyclability of the empty packaging;
    need for the return of at least one particular type of said empty packaging;
    market survey of return of at least one particular type of said empty packaging;
    time-related return of empty packaging;
    number of types of empty packaging returned per unit of time;
    type and/or location of the receiving point;
    kind of empty packaging; and
    technical properties of the empty packaging.

6. A method as defined in claim 1, further comprising:
    allowing the remuneration to be a variable amount and related to at least one of the following additional parameters:
        the number of the legal entities connected to the remuneration coordinator;
        the type of the legal entities connected to the remuneration coordinator;
        the individual remuneration level of the legal entities;
        the individual wholly or partly time-related remuneration or remuneration level of the legal entities;
        the legal entities' total remuneration level for a particular type or particular types of empty packaging;
        the legal entities' total wholly or partly time-related remuneration level for a particular type or particular types of empty packaging;
        public, private, socially beneficial or business interest that the said legal entities have in the return of empty packaging;
        the individual connection time of each of the legal entities to the remuneration coordinator, interactivity between legal entities; and
        type of remuneration.

7. A system for determining a remuneration to a consumer for the return of identifiable empty packaging, the system comprising:
    a reverse vending machine adapted to receive the empty packaging and to identify the empty packaging with respect to at least one chosen characteristic thereof;
    a remuneration coordinator connected to the reverse vending machine; and
    at least two, for the return of empty packaging, remuneration-providing legal entities selectively connected to the remuneration coordinator, each legal entity being adapted to provide an individual remuneration level for the empty packaging;
    wherein the remuneration coordinator is adapted to give the remuneration to the consumer via the reverse vending machine as the total of the individual remuneration levels of the connected legal entities that are applicable at any given time.

8. A system as defined in claim 7, wherein each legal entity is adapted to determine a remuneration for each returned article of empty packaging related to at least one of the following parameters:
    fixed deposit value of the empty packaging:
    type of material of the empty packaging;
    value of the material of the empty packaging;
    recyclability of the empty packaging;
    need for the return of at least one particular type of said empty packaging;
    market survey of return of at least one particular type of said empty packaging;
    time-related return of empty packaging;
    number of types of empty packaging returned per unit of time;
    type and/or location of the receiving point;
    kind of empty packaging; and
    technical properties of the empty packaging.

9. A system as defined in claim 7, wherein the remuneration coordinator is adapted to provide for each returned article of empty packaging a remuneration of variable amount related to at least one of the following parameters:

the number of the legal entities connected to the remuneration coordinator;

the type of the legal entities connected to the remuneration coordinator;

the individual remuneration level of the legal entities;

the individual wholly or partly time-related remuneration or remuneration level of the legal entities;

the legal entities' total remuneration level for a particular type or particular types of empty packaging;

the legal entities' total wholly or partly time-related remuneration level for a particular type or particular types of empty packaging;

public, private, socially beneficial or business interest that the said legal entities have in the return of empty packaging;

the individual connection time of each of the legal entities to the remuneration coordinator, interactivity between legal entities; and type of remuneration.

10. A method for determining a remuneration to a consumer for an identifiable returned empty packaging, which method comprises:

the consumer returning the identifiable empty packaging to a reverse vending machine;

the reverse vending machine identifying the empty packaging with respect to at least one chosen characteristic thereof;

a remuneration coordinator in communication with the reverse vending machine connecting to at least two legal entities which each provides an individual remuneration level for the returned empty packaging; and the remuneration coordinator determining the remuneration for the empty packaging as the total of the individual remuneration levels that are applicable at any given time; and paying or giving the determined remuneration to the consumer from the remuneration coordinator via the reverse vending machine for the returned empty packaging.

11. A method for determining remuneration to a consumer for an identifiable empty packaging returned by the consumer to a reverse vending machine, which method comprises, a) identifying the empty packaging in a reverse vending machine with respect to at least one chosen characteristic of the returned empty packaging, b) providing a remuneration coordinator in communication with the reverse vending machine for determining the remuneration to the consumer for the returned empty packaging, c) connecting at least two legal entities, which each provides an individual remuneration level, to the remuneration coordinator, d) enabling the remuneration coordinator to determine the remuneration to the consumer for the returned empty packaging as a total of the individual remuneration levels of the legal entities that are applicable at any given time, and e) paying or giving the determined remuneration to the consumer from the remuneration coordinator via the return vending machine for the returned empty packaging.

* * * * *